(12) United States Patent
Fujiyama et al.

(10) Patent No.: US 11,594,060 B2
(45) Date of Patent: Feb. 28, 2023

(54) ANIMAL INFORMATION MANAGEMENT SYSTEM AND ANIMAL INFORMATION MANAGEMENT METHOD

(71) Applicant: Panasonic Intellectual Property Management Co., Ltd., Osaka (JP)

(72) Inventors: Hiromitsu Fujiyama, Hyogo (JP); Yuichi Inaba, Osaka (JP); Yoshihiro Sugishita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/268,142

(22) PCT Filed: Jul. 23, 2019

(86) PCT No.: PCT/JP2019/028756
§ 371 (c)(1),
(2) Date: Feb. 12, 2021

(87) PCT Pub. No.: WO2020/044869
PCT Pub. Date: Mar. 5, 2020

(65) Prior Publication Data
US 2021/0216758 A1   Jul. 15, 2021

(30) Foreign Application Priority Data
Aug. 30, 2018  (JP) .............................. JP2018-161466

(51) Int. Cl.
*G06V 40/10*   (2022.01)
*G06T 7/90*   (2017.01)
(Continued)

(52) U.S. Cl.
CPC ............ *G06V 40/10* (2022.01); *A01K 11/004* (2013.01); *A01K 29/005* (2013.01); *G06T 7/20* (2013.01);
(Continued)

(58) Field of Classification Search
None
See application file for complete search history.

(56) References Cited

U.S. PATENT DOCUMENTS 6,285,780 B1   9/2001  Yamakita
10,398,316 B1 *  9/2019  Betts-Lacroix .......... H04N 5/33
(Continued)

FOREIGN PATENT DOCUMENTS

JP   11-161796 A   6/1999
JP   2015-173732 A   10/2015
(Continued)

OTHER PUBLICATIONS

International Search Report (ISR) dated Oct. 29, 2019 in International (PCT) Application No. PCT/JP2019/028756.
(Continued)

*Primary Examiner* — James M Anderson, II
(74) *Attorney, Agent, or Firm* — Renner, Otto, Boisselle & Sklar, LLP

(57) ABSTRACT

An animal information management system includes an identification information obtaining unit which obtains identification information of an animal included in a first image, based on the first image captured by an imaging device during patrol imaging of a predetermined region in a first zoom setting in which only part of the predetermined region is an imaging target, the animal being included in animals present in the predetermined region; and a control unit which causes the imaging device to capture a second image including the animal in a second zoom setting having a zooming magnification lower than that of the first zoom setting when the identification information is obtained.

11 Claims, 8 Drawing Sheets

(51) Int. Cl.
    *G06T 7/70*    (2017.01)
    *A01K 11/00*   (2006.01)
    *A01K 29/00*   (2006.01)
    *G06T 7/20*    (2017.01)
    *G06T 7/60*    (2017.01)
    *H04N 5/232*   (2006.01)
    *H04N 7/18*    (2006.01)

(52) U.S. Cl.
    CPC .................. *G06T 7/60* (2013.01); *G06T 7/70* (2017.01); *G06T 7/90* (2017.01); *H04N 5/23296* (2013.01); *H04N 7/183* (2013.01); *H04N 5/23203* (2013.01)

(56) References Cited

U.S. PATENT DOCUMENTS

| | | | |
|---|---|---|---|
| 2007/0120979 A1* | 5/2007 | Zhang | H04N 7/185 348/154 |
| 2015/0261197 A1* | 9/2015 | Wilkinson | A01G 9/24 700/276 |
| 2015/0327518 A1 | 11/2015 | Han et al. | |
| 2016/0127641 A1* | 5/2016 | Gove | H04N 5/23218 348/143 |
| 2017/0142323 A1* | 5/2017 | Saito | H04N 5/23206 |
| 2018/0228129 A1* | 8/2018 | Yajima | G06V 10/95 |
| 2019/0037800 A1* | 2/2019 | Betts-Lacroix | A61B 5/16 |
| 2019/0186981 A1 | 6/2019 | Sugaya | |
| 2019/0197445 A1 | 6/2019 | Ohashi | |
| 2021/0045361 A1* | 2/2021 | Dumm | A61K 31/20 |

FOREIGN PATENT DOCUMENTS

| | | | |
|---|---|---|---|
| JP | 2018-007625 A | 1/2018 | |
| WO | 2017/134909 A1 | 8/2017 | |
| WO | WO-2017134909 A1 * | 8/2017 | ............ A01K 13/00 |
| WO | 2017/208436 A1 | 12/2017 | |
| WO | 2017/217169 A1 | 12/2017 | |

OTHER PUBLICATIONS

Written Opinion dated Oct. 29, 2019 in International (PCT) Application No. PCT/JP2019/028756.

Extended European Search Report for corresponding EP Application 19853446.3 dated Sep. 30, 2021.

* cited by examiner

ANIMAL INFORMATION MANAGEMENT SYSTEM AND ANIMAL INFORMATION MANAGEMENT METHOD

TECHNICAL FIELD

The present disclosure relates to an animal information management system and an animal information management method.

BACKGROUND ART

Techniques of identifying animal individuals and managing the states of growth of the animals or their health conditions are known in the related art. PTL 1 discloses a biological information processing apparatus which identifies animal individuals using images.

CITATION LIST

Patent Literature

PTL 1: Japanese Unexamined Patent Application Publication No. 2018-007625

SUMMARY OF THE INVENTION

Technical Problem

The present disclosure provides an animal information management system and an animal information management method which enable efficient identification of animal individuals using images.

Solutions to Problem

The animal information management system according to one aspect of the present disclosure includes an identification information obtaining unit configured to obtain identification information of an animal included in a first image, based on the first image captured by an imaging device during patrol imaging of a predetermined region in a first zoom setting in which only part of the predetermined region is an imaging target, the animal being included in animals present in the predetermined region; and a control unit configured to cause the imaging device to capture a second image including the animal in a second zoom setting having a zooming magnification lower than a zooming magnification of the first zoom setting when the identification information is obtained.

The animal information management method according to one aspect of the present disclosure includes obtaining identification information of an animal included in a first image, based on the first image captured by an imaging device during patrol imaging of a predetermined region in a first zoom setting in which only part of the predetermined region is an imaging target, the animal being included in animals present in the predetermined region; and causing the imaging device to capture a second image including the animal in a second zoom setting having a zooming magnification lower than a zooming magnification of the first zoom setting when the identification information is obtained.

Advantageous Effect of Invention

The animal information management system and the animal information management method according to the present disclosure enable efficient identification of animal individuals using images.

DESCRIPTION OF EXEMPLARY EMBODIMENTS

Figure 1:
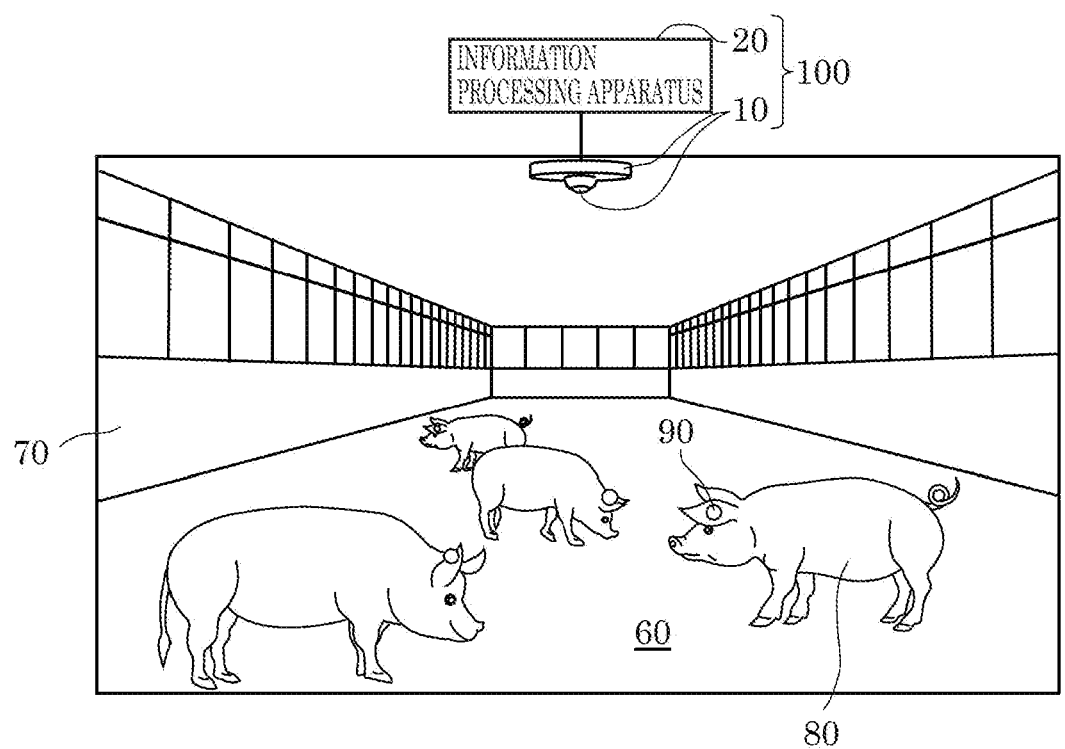
FIG. 1 is a diagram illustrating a schematic configuration of the animal information management system according to an embodiment.

An embodiment will now be described with reference to the drawings. The embodiment described below illustrates comprehensive or specific examples. Numeric values, shapes, materials, components, arrangements and positions of the components, and connections forms thereof shown in the embodiment below are illustrative, and should not be construed as limitations to the present disclosure. Moreover, among the components of the embodiment below, the components not described in an independent claim will be described as arbitrary components.

The drawings are schematic views, and are not always strictly drawn. In the drawings, identical referential numerals are given to substantially identical configurations, and the duplication of the description will be omitted or simplified in some cases.

Embodiment

[Configuration]

Figure 2:
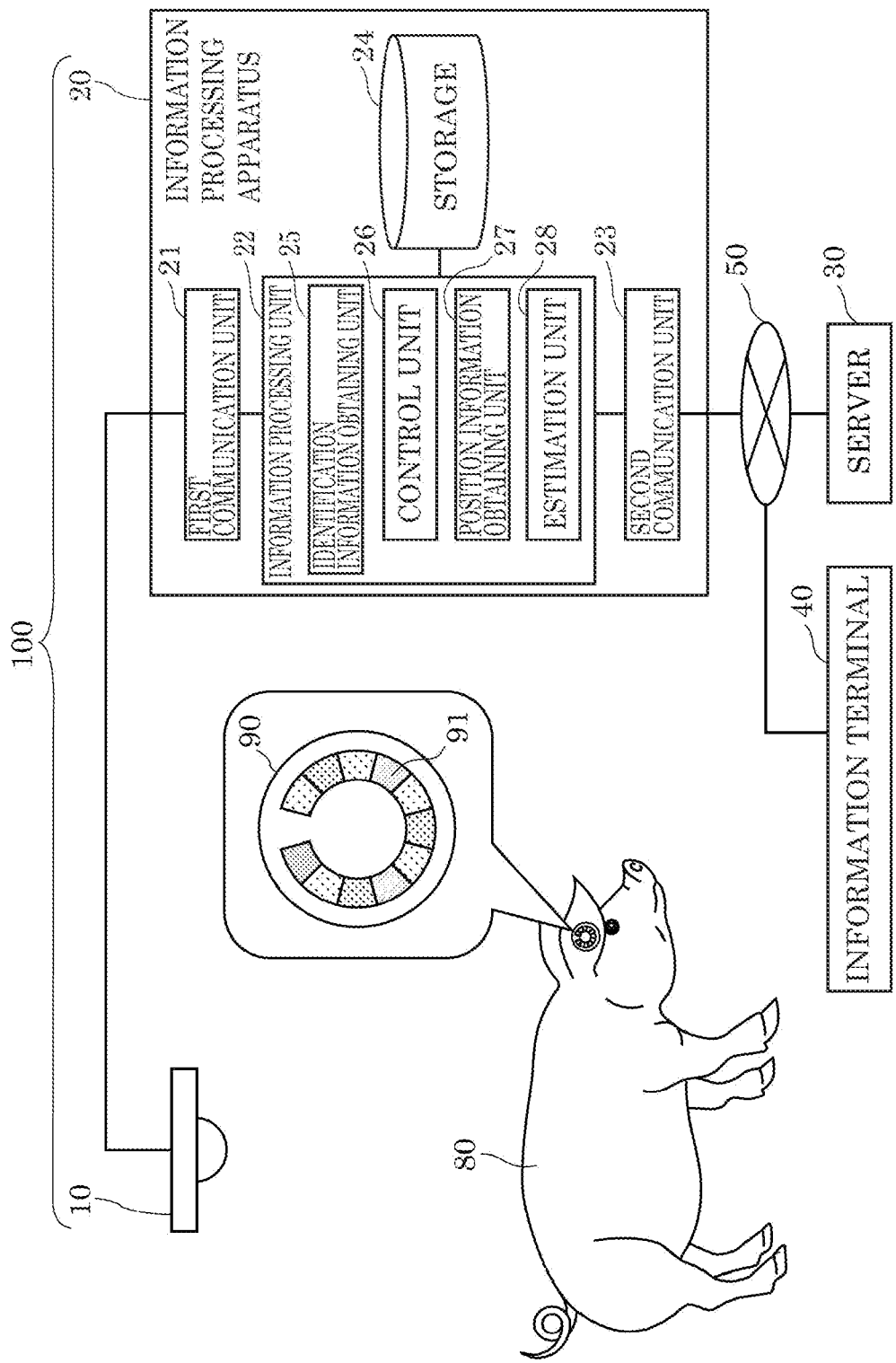
FIG. 2 is a block diagram illustrating a functional configuration illustrating the animal information management system according to the embodiment.

The animal information management system according to an embodiment will now be described with reference to the drawings. First, the configuration of the animal information management system according to the embodiment will be described. FIG. 1 is a diagram illustrating a schematic configuration of the animal information management system according to the embodiment. FIG. 2 is a block diagram illustrating the functional configuration of the animal information management system according to the embodiment.

As illustrated in FIG. 1, animal information management system 100 is a system which can individually manage pieces of information on a plurality of pigs 80 in pig pen 70 based on an image of an inside of pig pen 70 captured by imaging device 10. A raiser of pigs 80 can know the growth states of pigs 80 by use of animal information management system 100. As illustrated in FIG. 2, animal information management system 100 includes imaging device 10 and information processing apparatus 20. FIG. 2 also illustrates server 30 and information terminal 40.

Imaging device 10 is a camera attached on the ceiling of pig pen 70 or the like to capture the inside of the whole pig pen 70 as predetermined region 60. Imaging device 10 has pan, tilt, and zoom functions. Imaging device 10 is implemented by a lens and an image sensor, for example. Imaging device 10 may have a measurement function according to a time of flight (TOF) method. In other words, imaging device 10 may have a function to capture a distance image where each of pixel values indicates the distance from imaging device 10.

Information processing apparatus 20 can identify a plurality of pigs 80 present in predetermined region 60 based on the image captured by imaging device 10, and can output individual growth information (such as the estimated amount of movement and the estimated weight) for each of pigs 80. Information processing apparatus 20 includes first communication unit 21, information processing unit 22, second communication unit 23, and storage 24.

First communication unit 21 is a communication circuit (communication module) for information processing apparatus 20 to perform communication with imaging device 10. First communication unit 21 obtains the image (or image data) captured by imaging device 10, for example. The communication performed by first communication unit 21 may be wired communication or may be wireless communication. First communication unit 21 can communicate according to any communication standards.

Information processor 22 performs information processing using the image captured by first communication unit 21 to estimate the individual growth information for each of pigs 80 present in predetermined region 60. Although information processing unit 22 is implemented by a microcomputer, for example, information processing unit 22 may be implemented by a processor. Information processor 22 specifically includes identification information obtaining unit 25, control unit 26, position information obtaining unit 27, and estimation unit 28. The functions of identification information obtaining unit 25, control unit 26, position information obtaining unit 27, and estimation unit 28 will be described later.

Second communication unit 23 is a communication circuit (communication module) for information processing apparatus 20 to perform communication with other apparatuses through a wide area communication network such as the Internet 50. For example, second communication unit 23 transmits the individual growth information of each of pigs 80 to server 30 or information terminal 40. Transmission of such individual growth information to information terminal 40 of the raiser enables the raiser to know the growth states of pigs 80 in pig pen 70. The individual growth information may be transmitted to information terminal 40 via server 30. Server 30 may be connected to information terminal 40 through a communication network such as a local area network (LAN). In this case, the raiser can also use information terminal 40 within the LAN. The communication performed by second communication unit 23 may be wired communication or may be wireless communication. Second communication unit 23 can communicate according to any communication standards.

Storage 24 is a memory device which stores programs executed by information processing unit 22 to perform the information processing and a variety of pieces of information used in the information processing. Storage 24 is specifically implemented by a semiconductor memory.

Identification tags 90 are attached to pigs 80 in pig pen 70. Identification tag 90 is a disk-shaped member used to identify each individual pig 80, and is made of a polyurethane resin, for example. Identification tag 90 includes color code 91 which indicates the identification information (or the ID) of pig 80 by a sequence of mutually different adjacent colors.

Color code 91 indicates the identification information of pig 80 by a sequence of mutually different adjacent colors excluding colors of white and black (e.g., three colors of red (R), green (G), and blue (B)). In color code 91, the bit value is determined according to the adjacent colors. For example, when the adjacent colors in color code 91 change from red to blue, from blue to green, and from green to red, the bit value is "1". When the adjacent colors change from red to green, from green to blue, and from blue to red, the bit value is "0". Thus, the rule for identifying color code 91 as digital data is preliminarily specified. Although the mutually different adjacent colors are aligned in the form of a character C (or a Landolt ring) in identification tag 90, the mutually different adjacent colors may be linearly aligned, or may be aligned in a matrix.

[Operation]

Figure 3:
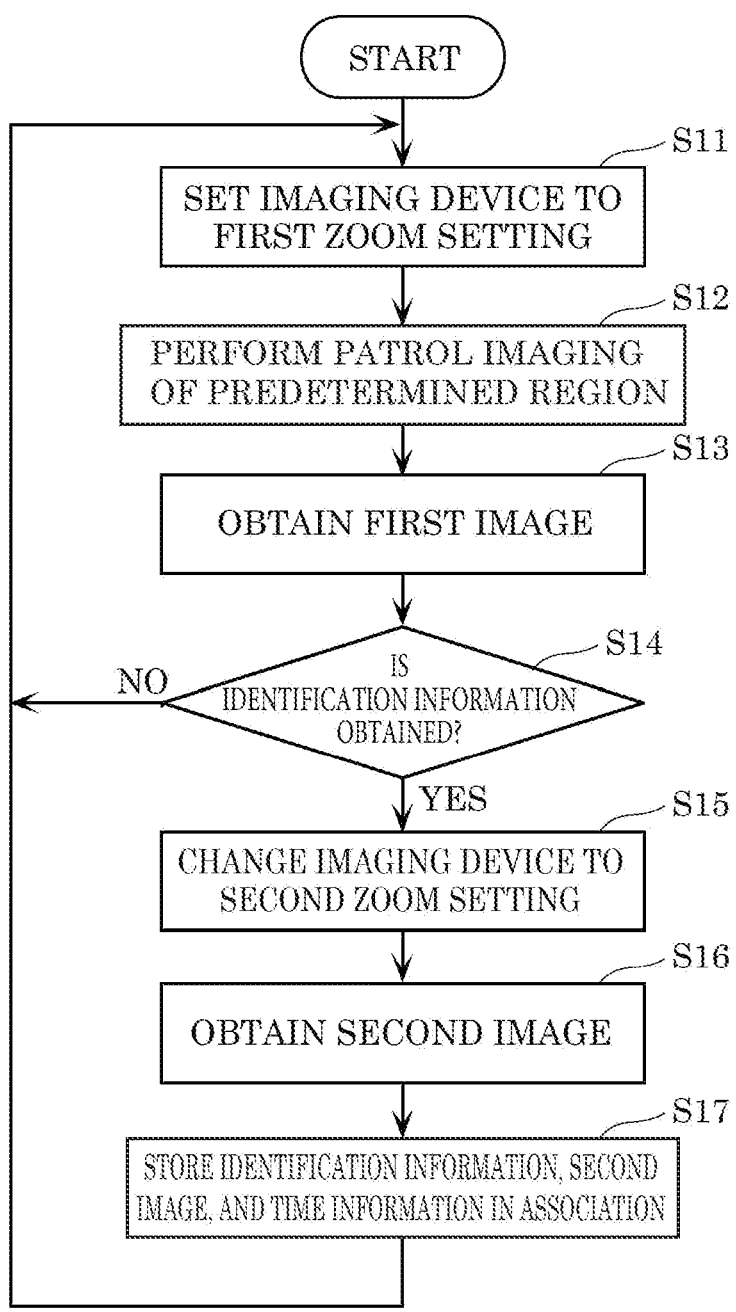
FIG. 3 is a flowchart illustrating the operation of the animal information management system according to the embodiment.

Next, the operation of animal information management system 100 will be described. FIG. 3 is a flowchart illustrating the operation of animal information management system 100.

First, control unit 26 included in information processing unit 22 sets the zoom setting of imaging device 10 to a first zoom setting by transmitting a setting instruction signal to imaging device 10 through first communication unit 21 (S11). In the first zoom setting, the zooming magnification is increased such that only part of predetermined region 60 is the target to be captured. The zooming magnification may be optically changed by changing the placement of the lens included in imaging device 10, or may be changed by signal processing performed on the image.

Figure 4:
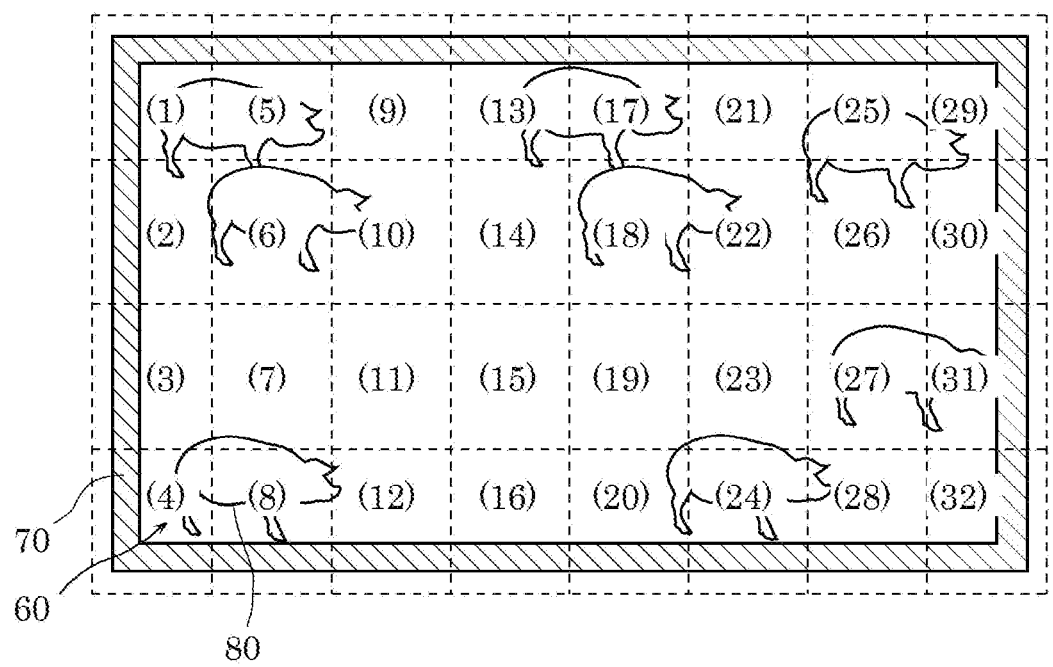
FIG. 4 is a plan view of a pig pen for illustrating patrol imaging thereof.

Next, by transmitting a control signal to imaging device 10 through first communication unit 21, control unit 26 causes imaging device 10 to perform patrol imaging of predetermined region 60 (S12). FIG. 4 is a plan view of pig pen 70 (predetermined region 60) for illustrating the patrol imaging thereof.

As illustrated in FIG. 4, pig pen 70 is divided into a matrix in planar view, and the resulting regions are defined as region (1), region (2), . . . , and region (32). In the patrol imaging, the target to be captured is sequentially changed in order of region (1), region (2), . . . , and region (32). To be noted, one region may partially overlap its adjacent region. Such a division and the capturing order in the patrol imaging are exemplary, and any patrol imaging method can be used.

Figure 5:
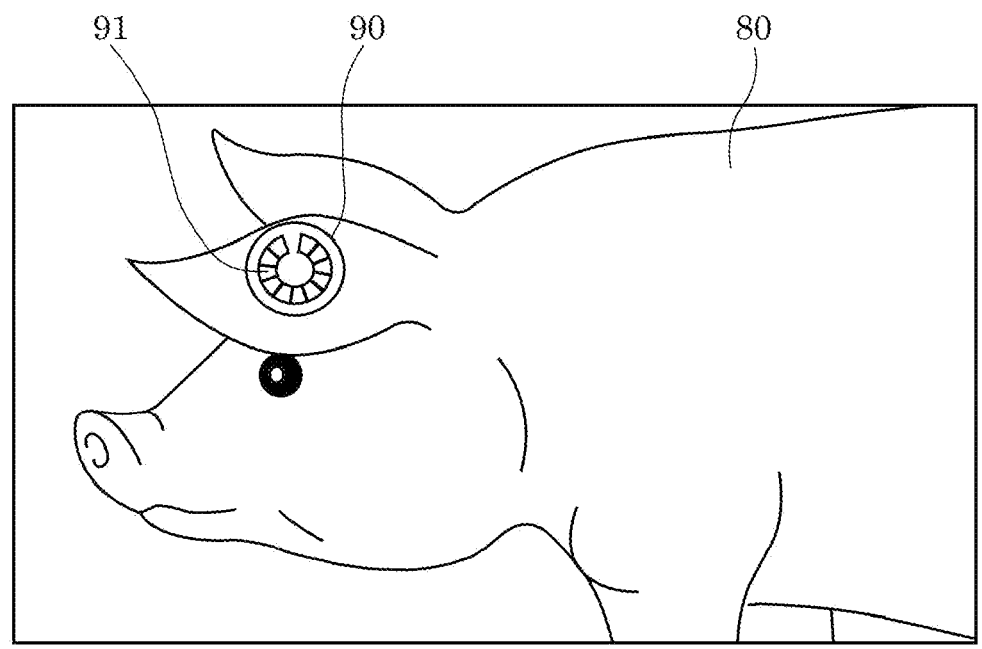
FIG. 5 is a diagram illustrating one example of a first image.

First communication unit 21 obtains a first image from imaging device during the patrol imaging (S13), and identification information obtaining unit 25 attempts to obtain the identification information by image recognition of the first image. FIG. 5 is a diagram illustrating one example of the first image. As illustrated in FIG. 5, when color code 91 of identification tag 90 is included in the first image, identification information obtaining unit 25 can obtain the identification information of pig 80 included in the first image.

Figure 6:
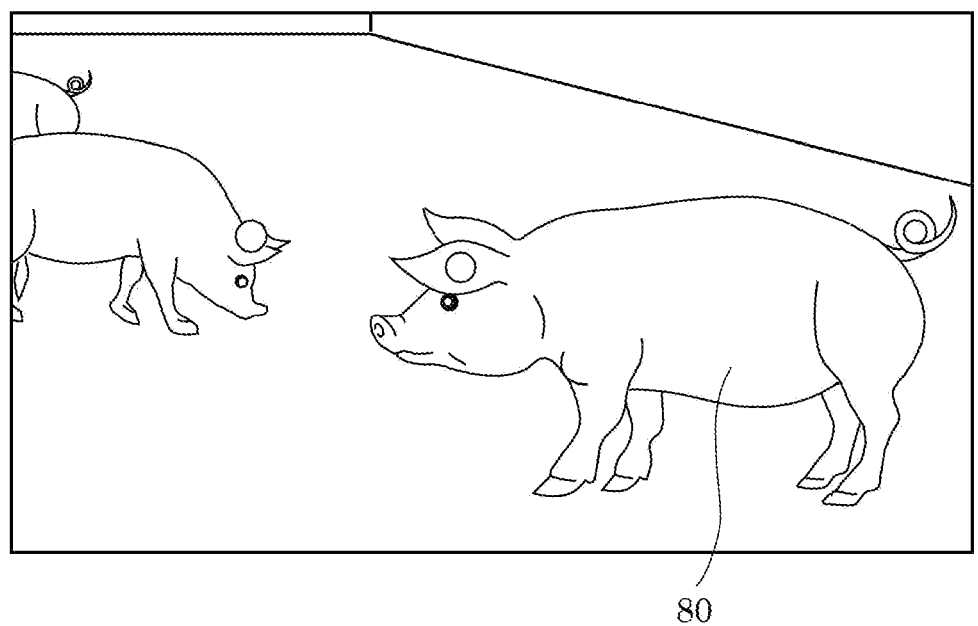
FIG. 6 is a diagram illustrating one example of a second image.

Control unit 26 determines whether identification information obtaining unit 25 has obtained the identification information (or whether identification information obtaining unit 26 successfully has obtained the identification information) (S14). When control unit 26 determines that the identification information is not obtained (No in S14), the patrol imaging (S12) and the first image obtaining (S13) are continued. In contrast, when control unit 26 determines that the identification information is successfully obtained (Yes in S14), control unit 26 changes the zoom setting of imaging device 10 from the first zoom setting to a second zoom setting by transmitting the setting instruction signal to imaging device 10 through first communication unit 21 (S15). In the second zoom setting, the zooming magnification is set lower than that of the first zoom setting, and a wider range than that of the first zoom setting is targeted. By transmitting a control signal to imaging device 10 through first communication unit 21, control unit 26 causes imaging device 10 to capture a second image including pig 80 having the identification information obtained in step S14 (S16). FIG. 6 is a diagram illustrating one example of the second image.

As illustrated in FIG. 6, the second zoom setting targets a sufficiently wide range such that at least the whole body of pig 80 can be captured. The captured second image is obtained by first communication unit 21.

Next, storage 24 stores the identification information, the second image, and the time information (e.g., the information indicating the time when the second image is captured) in association with each other (S17).

When the storage of the information above is completed, control unit 26 changes the zoom setting of imaging device 10 to the first zoom setting by transmitting the setting instruction signal to imaging device 10 through first communication unit 21 (S11). Subsequently, the patrol imaging (S12) and the first image obtaining (S13) are continued.

Thus, to detect identification tag 90, animal information management system 100 performs the patrol imaging at a certain level of the zoom-in state of imaging device 10. Such an operation can enhance the precision in detection of identification tag 90 compared to that in the zoom-out state. In other words, because errors in detection of identification tag 90 and re-detection thereof are reduced, animal information management system 100 can efficiently identify individuals in consideration of the precision in detection of the identification information.

Animal information management system 100 obtains the second image in a zoom-out state such that the whole body of one pig 80 is contained. Such an operation enables animal information management system 100 to obtain as many second images as possible in the range not significantly reducing the number of pixels.

[Estimation of Weight]

In step S17 of the flowchart illustrated in FIG. 3, the identification information, the second image, and the time information are stored in association with each other. Thus, estimation unit 28 can specify the projection geometry of pig 80 having the identification information based on these pieces of information above. For example, the projection geometry is obtained by specifying a portion of the second image including one whole pig 80 and performing contour extraction (or edge detection) on the specified portion. After the operation illustrated in the flowchart of FIG. 3 is performed for a certain period, the projection geometries of pigs 80 are obtained from a variety of angles. Estimation unit 28 can estimate the weights of pigs 80 using such projection geometries.

Figure 7:
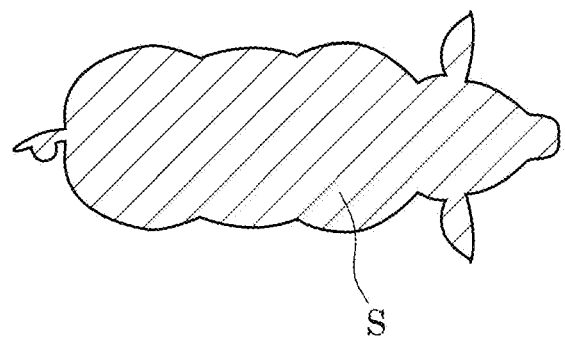
FIG. 7 is a diagram illustrating one example of a projection geometry of a pig viewed from above.

First, among the projection geometries of pig 80 having certain identification information, estimation unit 28 specifies projection geometries viewed from above (hereinafter, simply referred to as top-side projection geometries). For example, estimation unit 28 compares a referential top-side projection geometry preliminarily stored in storage 24 with the projection geometries, and specifies a projection geometry most similar to the referential top-side projection geometry as the top-side projection geometry. As a result, the top-side projection geometry illustrated in FIG. 7 is obtained, for example. FIG. 7 is a diagram illustrating one example of the top-side projection geometry. Estimation unit 28 then calculates projection area S of the top-side projection geometry.

Figure 8:
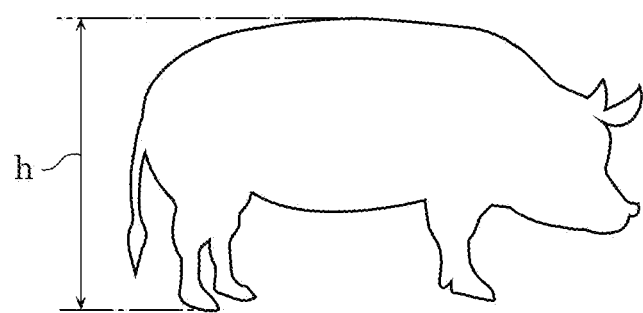
FIG. 8 is a diagram illustrating one example of a projection geometry of the pig viewed from a lateral direction.

Next, among the projection geometries of pig 80 having the certain identification information, estimation unit 28 specifies projection geometries viewed from a lateral side (hereinafter, simply referred to as lateral projection geometries). For example, estimation unit 28 compares a referential lateral projection geometry preliminarily stored in storage 24 with the projection geometries, and specifies a projection geometry most similar to the referential lateral projection geometry as the lateral projection geometry. As a result, the lateral projection geometry illustrated in FIG. 8 is obtained, for example. FIG. 8 is a diagram illustrating one example of the lateral projection geometry. Estimation unit 28 then calculates height h from the lateral projection geometry.

Storage 24 stores a function or a data table for calculating the estimated weight using projection area S and height h. In other words, estimation unit 28 can calculate (estimate) the weight of pig 80 using such a function or data table. The weight is daily calculated and accumulated in storage 24, for example.

Figure 9:
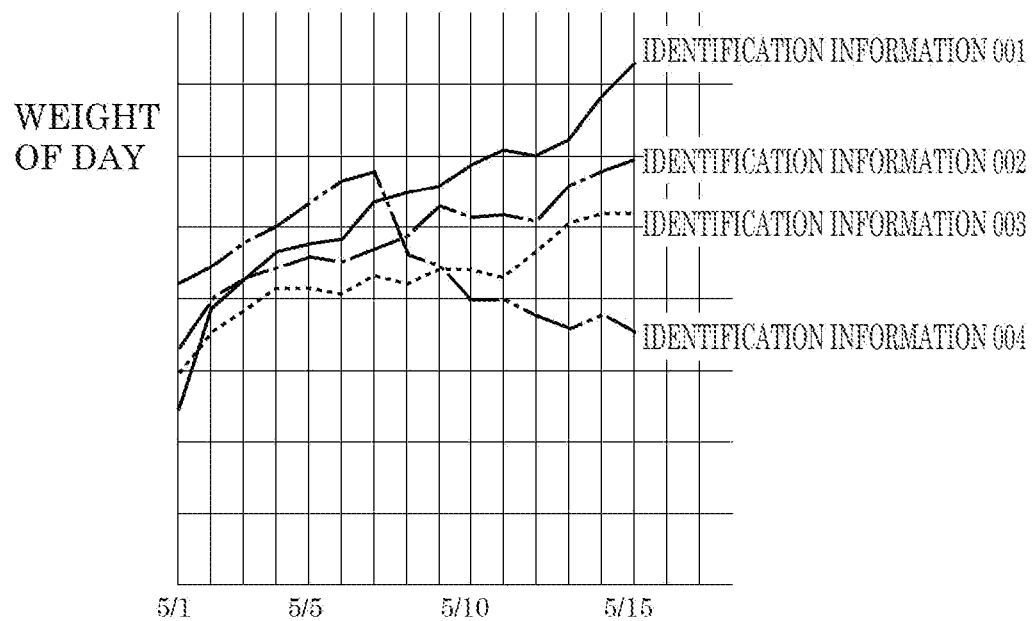
FIG. 9 is a diagram illustrating one example of the graph of the weight.

For example, the raiser operates information terminal 40 to transmit a request for the information indicating the weight of pig 80 from information terminal 40. Information processing apparatus 20 then transmits the individual growth information indicating the weight in response to the request. When information terminal 40 receives such individual growth information, the display of information terminal 40 displays a graph illustrated in FIG. 9 where the weights of pigs 80 are individually shown. FIG. 9 is a diagram illustrating one example of the graph of the weight.

The display of such a graph enables the raiser having information terminal 40 to know the weights of pigs 80 in pig pen 70.

Estimation unit 28 may perform statistic processing of the weights of pigs 80 to generate warning information, and may cause second communication unit 23 to transmit the warning to information terminal 40. For example, estimation unit 28 can specify the identification information of pig 80 having a weight extremely lighter than those of other pigs 80 (for example, the weight is lower than the average of the weights of all the pigs 80 by a predetermined value or more) to generate the warning information indicating that pig 80 having the identification information has a light weight. The content of the warning information is displayed on the display of information terminal 40 which receives the warning information. Thereby, the raiser can check the state of pig 80 identified from the warning information, and take measures such as diagnosis by a veterinarian.

Thus, estimation unit 28 estimates the weight of the animal based on the shape of pig 80 (e.g., the projection geometry) and the size (e.g., the projection area) in the second image. Thereby, animal information management system 100 can manage the weight of pig 80.

Any weight estimation method other than the method above can be used. For example, estimation unit 28 may estimate the weight by an image processing technique from a plurality of second images of pig 80 captured from different observing points.

[Estimation of Amount of Movement]

To be noted, position information obtaining unit 27 can also obtain the position information of pig 80 having the identification information obtained in step S14, and can further add the position information to the information stored in step S17 above. For example, based on the first image, position information obtaining unit 27 obtains the position information of pig 80 having the identification information in step S14. As illustrated in FIG. 4, the first image is an image captured during the patrol imaging. Thus, it can be specified in which region (for example, any one of regions (1) to (32)) in pig pen 70 (predetermined region 60) pig 80 is located.

Alternatively, in step S17, position information obtaining unit 27 may obtain the position information of pig 80 based on the second image. Specifically, position information obtaining unit 27 specifies the position (coordinates) of pig 80 in predetermined region 60 as the position information based on a variety of pieces of information such as the zooming magnification and the states of pan and tilt in the second zoom setting and the position of pig 80 on the second image.

In the case where the position information is stored in step S17 of the flowchart illustrated in FIG. 3 as above, the time-series data of the position information (coordinates) of each of pigs 80 is obtained after the operation in the flowchart is performed for a certain period. Estimation unit 28 may estimate the amount of movement of pig 80 using such time-series data. FIG. is a diagram conceptually illustrating the method of estimating the amount of movement of pig 80.

Figure 10:
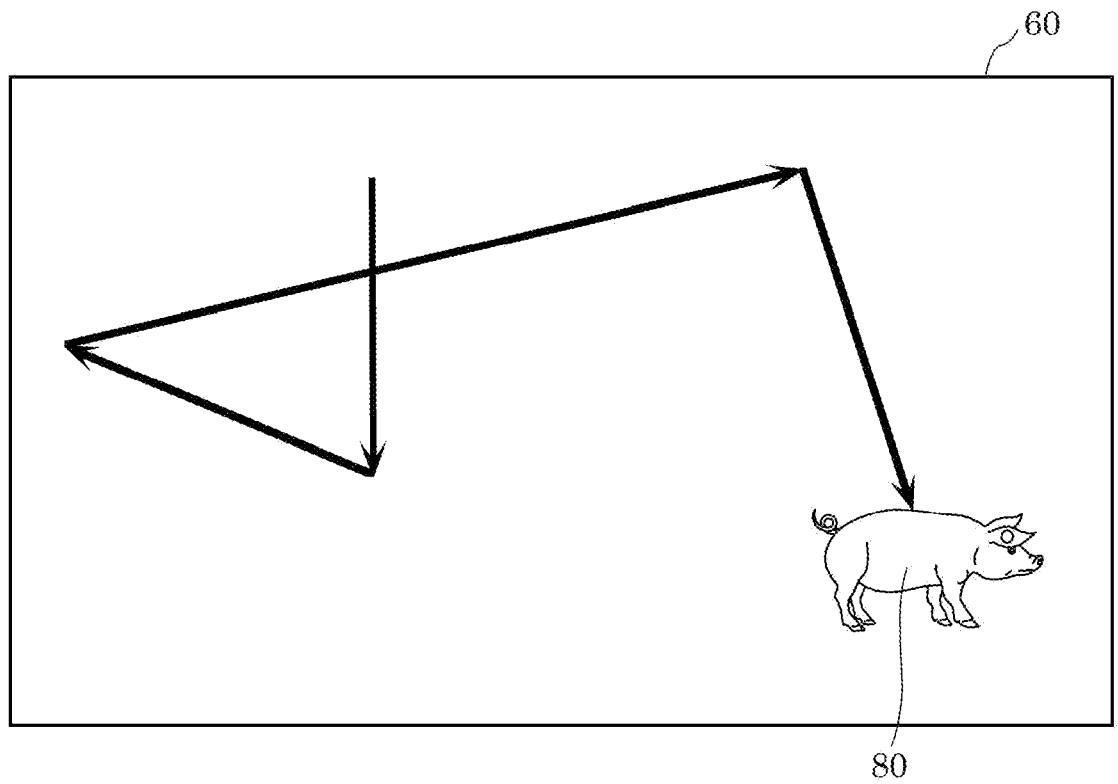
FIG. 10 is a diagram conceptually illustrating a method of estimating the amount of movement of the pig.

As illustrated in FIG. 10, for example, estimation unit 28 can calculate (estimate) the amount of movement of pig 80 by connecting the position information (coordinates) of pig 80 with straight lines according to the time series and adding the lengths of the straight lines. The amount of movement is calculated for each predetermined period (for example, daily), and is accumulated in storage 24, for example.

Figure 11:
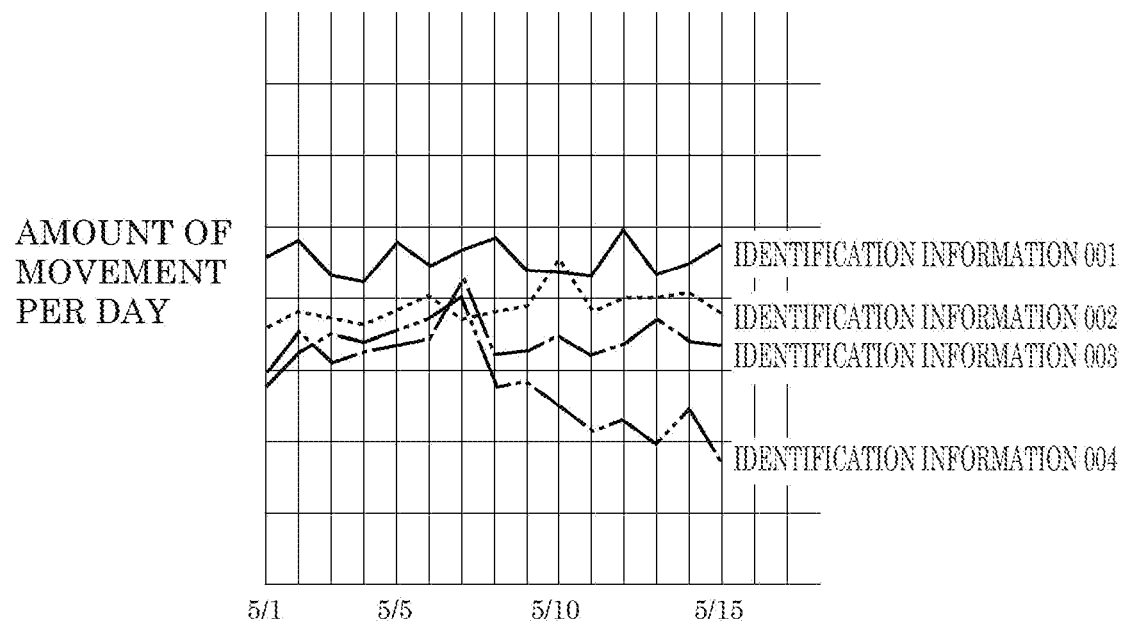
FIG. 11 is a diagram illustrating one example of the graph showing the amount of movement.

For example, the raiser operates information terminal 40 to transmit a request for the information indicating the amount of movement of pig 80 from information terminal 40. Information processing apparatus 20 then transmits the individual growth information indicating the amount of movement in response to the request. When information terminal 40 receives such individual growth information, the display of information terminal 40 displays a graph illustrated in FIG. 11 where the amounts of movement of pigs 80 are individually shown. FIG. 11 is a diagram illustrating one example of the graph of the amount of movement.

The display of such a graph enables the raiser having information terminal 40 to know the amounts of movement of pigs 80 in pig pen 70.

Estimation unit 28 may perform statistic processing of the amounts of movement of pigs 80 to generate warning information, and may cause second communication unit 23 to transmit the warning information to information terminal 40. For example, estimation unit 28 can specify the identification information of pig 80 whose amount of movement per day is extremely smaller than those of other pigs 80 (for example, the amount of movement per day is smaller than the average of those of all the pigs 80 by a predetermined value or more) to generate the warning information indicating that the amount of movement of pig 80 having the identification information is small. The content of the warning information is displayed on the display of information terminal 40 which receives the warning information. Thereby, the raiser can check the way of walking of pig 80 identified from the warning information, and take measures such as diagnosis by a veterinarian.

Thus, estimation unit 28 estimates the amount of movement of pig 80 for a predetermined period (for example, one day) based on the position information of pig 80 obtained during the predetermined period. Thereby, animal information management system 100 can manage the amount of movement of pig 80.

[Modifications]

Although identification information obtaining unit 25 obtains the identification information of pig 80 using identification tag 90 in the embodiment described above, such a method of obtaining the identification information is illustrative.

Figure 12:
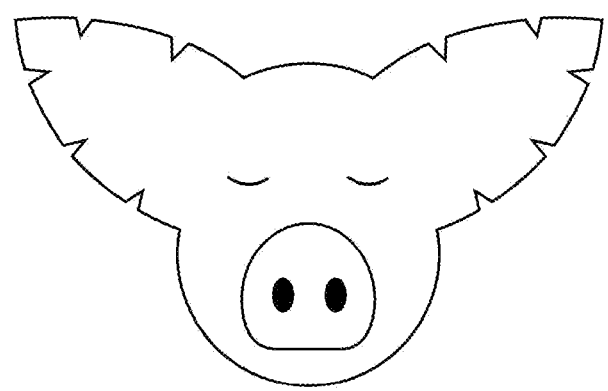
FIG. 12 is a diagram illustrating one example of ear notching.

For example, each of pigs 80 may be ear-notched, and identification information obtaining unit 25 may obtain the identification information of each pig 80 by detecting the ear notch included in the first image. FIG. 12 is a diagram illustrating one example of ear notching.

As illustrated in FIG. 12, ear notching means that the edge of the ear is cut out. Pig 80 can be identified by the number of cutouts and the positions. Identification information obtaining unit 25 can specify the position and the number of ear notches included in the first image by image processing (such as contour extraction) to obtain the identification information of pig 80.

Alternatively, identification information obtaining unit 25 may perform facial recognition of pig 80 included in the first image to obtain the identification information of pig 80. In this case, the face images of pigs 80 in pig pen 70 are preliminarily stored in storage 24 as their referential face images. Each referential face image is stored in association with the identification information.

Identification information obtaining unit 25 can compare the face image of pig 80 included in the first image with the referential face images stored in storage 24, and can obtain the identification information corresponding to the most similar referential face image as the identification information of pig 80 included in first image.

Alternatively, identification information obtaining unit 25 may detect the silhouette of pig 80 included in the first image to obtain the identification information of pig 80. The silhouette here means the outlines of the nose, the eyes, and the head (face) or the shape of a specific portion of the body such as the tail, the ears, or the horn (when the target is an animal having a horn), rather than the silhouette of the entire pig 80. In this case, the silhouettes of the specific portions of pigs 80 in pig pen 70 are preliminarily stored in storage 24 as the referential silhouettes. These referential silhouettes are stored in association with the identification information.

Identification information obtaining unit 25 detects the silhouette of the specific portion of pig 80 included in the first image through image processing (such as contour extraction). Identification information obtaining unit 25 compares the detected silhouette with the referential silhouettes stored in storage 24, and obtains the identification information associated with the most similar referential silhouette as the identification information of pig 80 included in the first image.

[Effects]

As described above, animal information management system 100 includes identification information obtaining unit 25 which obtains identification information of an animal included in a first image based on the first image captured by imaging device 10 during patrol imaging of predetermined region 60 in a first zoom setting in which only part of predetermined region 60 is an imaging target, the animal being included in animals present in predetermined region 60; and control unit 26 which causes imaging device 10 to capture a second image including the animal in a second zoom setting having a zooming magnification lower than that of the first zoom setting when the identification information is obtained.

Because such an animal information management system 100 performs the patrol imaging in the zoom-in state suitable for obtaining the identification information, errors in obtaining the identification information are reduced. In other words, animal information management system 100 can efficiently identify animal individuals using images.

Moreover, for example, animal information management system 100 further includes position information obtaining unit 27 which obtains position information of the animal based on the first image, and storage 24 which stores the identification information and the position information in association with each other.

Such an animal information management system 100 can manage the position of the animal.

Moreover, for example, animal information management system 100 further includes estimation unit 28 which estimates the amount of movement of the animal for a predetermined period based on the position information of the animal obtained during the predetermined period.

Such an animal information management system 100 can manage the amount of movement of the animal during the predetermined period.

Moreover, for example, animal information management system 100 further includes estimation unit 28 which estimates the weight of the animal based on the shape and the size of the animal on the second image.

Such an animal information management system 100 can manage the weight of the animal.

Moreover, for example, identification tags 90 are attached to the animals, each of identification tags 90 indicating the identification information of the animal by a sequence of mutually different adjacent colors. Identification information obtaining unit 25 obtains the identification information of the animal by detecting identification tag 90 included in the first image. Identification tag 90 is one example of an identification member.

Such an animal information management system 100 can obtain the identification information of the animal by detecting identification tag 90.

Each of the animals is ear-notched, and identification information obtaining unit 25 obtains the identification information of the animal by detecting the ear notch included in the first image.

Such an animal information management system 100 can obtain the identification information of the animal by detecting the ear notch.

Moreover, identification information obtaining unit 25 obtains the identification information of the animal by performing facial recognition of the animal included in the first image.

Such an animal information management system 100 can obtain the identification information of the animal by facial recognition.

Moreover, identification information obtaining unit 25 obtains the identification information of the animal by detecting a silhouette of the animal included in the first image.

Such an animal information management system 100 can obtain the identification information of the animal by detecting the silhouette of the animal.

Other Embodiments

The embodiment has been described above, but the embodiment should not be construed as a limitations to the present disclosure.

For example, although the animal information management system manages the information of the pigs in the pig pen, it may manage the information of farm animals other than pigs, such as cows. The animal information management system may also be used in applications other than livestock raising, such as zoos.

In the embodiment above, the processing executed by a specific processor may be executed by another processor. The order of processings may be changed, or the processings may be executed in parallel.

In the embodiment above, the components may be implemented by executing the software programs suitable for the components, respectively. Alternatively, the components may be implemented by a program executing unit such as a CPU or a processor, which reads out and executes the software programs recorded on a recording medium such as a hard disk or a semiconductor memory.

Alternatively, the components may be implemented by hardware. For example, the component such as the control unit may be a circuit (or an integrated circuit). These circuits may be formed into a single circuit as a whole, or may be formed as separate circuits. These circuits may be general-purpose circuits, or may be dedicated circuits.

The general or specific aspects of the present disclosure may be implemented by a system, a device, a method, an integrated circuit, a computer program, or a recording medium such as a computer-readable CD-ROM. The general or specific aspects of the present disclosure may be implemented by any combination of a system, a device, a method, an integrated circuit, a computer program, and a recording medium.

For example, the present disclosure may be implemented as an animal information management method executed by a computer such as an animal information management system, may be implemented as a program causing a computer to execute the animal information management method, or may be implemented as a non-transitory computer-readable recording medium having such a program recorded thereon.

Although the animal information management system is implemented by a plurality of devices in the embodiment above, the animal information management system may be implemented as a single device. When the animal information management system is implemented by a plurality of devices, the components included in the animal information management system described in the embodiment may be distributed to the plurality of devices in any manner.

Alternatively, the animal information management system may be implemented as a client server system. In this case, part or all of the processings performed by the information processing apparatus in the description of the embodiment is performed by the server.

Besides, the present disclosure also covers embodiments obtained by performing a variety of modifications conceived by persons skilled in the art on the embodiment above, or embodiments including any combination of the components and the functions included in the embodiment without departing the gist of the present disclosure.

REFERENCE MARKS IN THE DRAWINGS 10 imaging device
24 storage
25 identification information obtaining unit
26 control unit
27 position information obtaining unit
28 estimation unit
60 predetermined region
80 pig (animal)
90 identification tag (identification member)
100 animal information management system

The invention claimed is:

1. An animal information management system, comprising:
a processor,
wherein the processor is configured to:
obtain identification information of an animal included in a first image, based on the first image captured by an imaging device during patrol imaging of a predetermined region in a first zoom setting in which only part of the predetermined region is an imaging target, the animal being included in animals present in the predetermined region;
cause the imaging device to capture a second image including the animal in a second zoom setting having a zooming magnification lower than a zooming magnification of the first zoom setting when the processor determines that the identification information is successfully obtained;
when determining that the identification information is not obtained, the patrol imaging of the predetermined region in the first zoom setting is continued while maintaining the first zoom setting, and
in the patrol imaging, the imaging device changes the imaging target by panning or tilting while maintaining the first zoom setting.

2. The animal information management system according to claim 1, wherein:
the processor is configured to obtain position information of the animal based on the first image; and
further comprising a storage configured to store the identification information and the position information in association with each other.

3. The animal information management system according to claim 2, wherein:
the processor is configured to estimate an amount of movement of the animal during a predetermined period based on the position information of the animal obtained during the predetermined period.

4. The animal information management system according to claim 1, wherein:
the processor is configured to estimate a weight of the animal based on a shape and a size of the animal in the second image.

5. The animal information management system according to claim 1,
wherein identification members are attached to the animals, each of the identification members indicating the identification information of the animal by a sequence of mutually different adjacent colors, and
the processor is configured to obtain the identification information of the animal by detecting the identification member included in the first image.

6. The animal information management system according to claim 1,
wherein each of the animals is ear-notched, and
the processor is configured to obtain the identification information of the animal by detecting the ear notch of the animal included in the first image.

7. The animal information management system according to claim 1,
wherein the processor is configured to obtain the identification information of the animal by performing facial recognition of the animal included in the first image.

8. The animal information management system according to claim 1,
wherein the processor is configured to obtain the identification information of the animal by detecting a silhouette of the animal included in the first image.

9. An animal information management method, comprising:
obtaining identification information of an animal included in a first image, based on the first image captured by an imaging device during patrol imaging of a predetermined region in a first zoom setting in which only part of the predetermined region is an imaging target, the animal being included in animals present in the predetermined region;
causing the imaging device to capture a second image including the animal in a second zoom setting having a zooming magnification lower than a zooming magnification of the first zoom setting when determining that the identification information is successfully obtained;
when determining that the identification information is not obtained, continuing the patrol imaging of the predetermined region in the first zoom setting while maintaining the first zoom setting, and
in the patrol imaging, the imaging device changes the imaging tar-et by panning or tilting while maintaining the first zoom setting.

10. The animal information management system according to claim 1,
wherein the first image captured in the first zoom setting includes only part of a body of the animal, and
the second image captured in the second zoom setting includes an entirety of the body of the animal.

11. The animal information management method according to claim 9,
wherein the first image captured in the first zoom setting includes only part of a body of the animal, and
the second image captured in the second zoom setting includes an entirety of the body of the animal.

* * * * *